US007003157B2

(12) United States Patent
Morita et al.

(10) Patent No.: US 7,003,157 B2
(45) Date of Patent: Feb. 21, 2006

(54) SHEET HANDLING SYSTEM

(75) Inventors: Masahiro Morita, Owariasahi (JP); Masato Teramoto, Nagoya (JP)

(73) Assignee: Hitachi, Ltd., Tokyo (JP)

( * ) Notice: Subject to any disclaimer, the term of this patent is extended or adjusted under 35 U.S.C. 154(b) by 98 days.

(21) Appl. No.: 10/649,662

(22) Filed: Aug. 28, 2003

(65) Prior Publication Data

US 2004/0042660 A1 Mar. 4, 2004

Related U.S. Application Data

(62) Division of application No. 09/639,741, filed on Aug. 15, 2000, now abandoned.

(30) Foreign Application Priority Data

Dec. 22, 1999 (JP) ................................ 11-365393

(51) Int. Cl.
*G06K 9/00* (2006.01)

(52) U.S. Cl. ...................................................... 382/181

(58) Field of Classification Search ................ 382/101, 382/135, 137, 139, 165, 176–177, 181, 237, 382/284

See application file for complete search history.

(56) References Cited

U.S. PATENT DOCUMENTS 4,264,808 A 4/1981 Owens et al. ................. 705/30
4,905,097 A * 2/1990 Watanabe et al. .......... 358/3.08
5,128,748 A * 7/1992 Murakami et al. .......... 358/500
5,198,975 A 3/1993 Baker et al. .................. 705/45
5,344,132 A 9/1994 LeBrun et al. ................ 271/35
5,530,907 A 6/1996 Pavey et al. ................... 710/69
5,703,962 A 12/1997 Niki et al. .................. 382/173
5,751,842 A 5/1998 Riach et al. ................ 382/137
5,874,717 A 2/1999 Kern et al. ................. 235/379
5,889,896 A 3/1999 Meshinsky et al. ......... 382/305
5,898,157 A * 4/1999 Mangili et al. ............. 235/380
5,999,664 A 12/1999 Mahoney et al. ........... 382/305
6,038,351 A 3/2000 Rigakos ...................... 382/305
6,041,309 A 3/2000 Laor ........................... 705/14
6,055,336 A * 4/2000 Niki ........................... 382/237
6,097,834 A 8/2000 Krouse et al. .............. 382/137
6,212,504 B1 4/2001 Hayosh ....................... 705/64

(Continued)

FOREIGN PATENT DOCUMENTS

JP 58-169677 6/1983

(Continued)

*Primary Examiner*—Daniel Mariam
(74) *Attorney, Agent, or Firm*—Mattingly, Stanger, Malur & Brundidge, P.C.

(57) ABSTRACT

A sheet handling method and a sheet handling system in which various types of sheets can be easily determined in a short period of time, which contributes to increasing efficiency in subsequent application processing in a financial institution or the like. The system includes terminal equipment disposed in an office or the like of a financial institution and center apparatus disposed in a financial institution unit or in a store control unit. Image data read by the terminal equipment from a sheet to be processed is received from an image reader and is edited into image data in a predetermined format. The image data is sent to the center apparatus in which image data of a specified recognition area is separated from the image data received from the terminal equipment, contents described on the sheet are recognized according to the image data separated. Moreover, image data of a specified area is separated from the received image data, and a sheet image corresponding to the image data separated and a result of the recognition are displayed in parallel with each other.

8 Claims, 15 Drawing Sheets

U.S. PATENT DOCUMENTS

| | | | | |
|---|---|---|---|---|
| 6,347,156 | B1 * | 2/2002 | Kamada et al. | 382/237 |
| 6,456,740 | B1 | 9/2002 | Carini et al. | 382/187 |
| 6,463,447 | B1 | 10/2002 | Marks et al. | 715/513 |
| 6,466,954 | B1 * | 10/2002 | Kurosawa et al. | 715/520 |

FOREIGN PATENT DOCUMENTS

| | | |
|---|---|---|
| JP | 61-206085 | 12/1986 |
| JP | 11-167603 | 6/1999 |

* cited by examiner

SHEET HANDLING SYSTEM

This is a divisional application of U.S. Ser. No. 09/639,741, filed Aug. 15, 2000, which is now abandoned.

BACKGROUND OF THE INVENTION

1. Field of the Invention

The present invention relates to a sheet handling system and a sheet filing system in which a type of a sheet is automatically recognized among various sheets such as a paying-in slip, a check, and a transfer slip handled by, for example, a financial institution and the like and necessary information described on the sheet is supplied to an application processing system subsequent thereto.

2. Description of the Related Art

In financial institutions such as a bank and the post office, although an automatic teller's machine has been broadly installed, there exist sheets which cannot be handled with the automatic teller's machine, for example, paying-in slips for public utilities charges (taxes, telephone charges, and an electric fee) as well as checks. Such sheets are treated through a window job to handle the sheets for the paying-in, withdrawal, and transfer transactions. Moreover, paying-in and withdrawal of a large amount of money using a check or the like which cannot be handled by the automatic teller's machine are treated at a window job using paying-in and withdrawal slips.

In the window job using such various sheets, when a sheet is received from a client, a clerk at the window determines a sheet type thereof such as a paying-in or withdrawal slip, checks whether or not necessary items are completely described and whether or not an account number and a client name are correctly written, and then starts her or his operation necessary for the sheet received.

However, the sheets received at windows of banks and the post office are broadly classified into various types: (1) formal sheets of formats formulated by own bank, (2) barcode sheets which are formulated by telephone companies, electric power companies, or the like for the paying-in of telephone charges, electric fees, and gas charges and on which a barcode such as a company code is printed in an area thereof, (3) sheets conforming to standards of the Ministry of Posts and Telecommunications on which a symbol code, i.e., a numeric code of a plurality of positions, of a telephone company, an electric power company, a loan company, or the like is printed in an area thereof, (4) checks or promissory notes in formats issued from own bank or other banks, (5) sheets issued from each local government for the paying-in of a local tax or the like, and (6) sheets in formats uniformly formulated by the banks in Japan.

Consequently, at the windows of financial institutions such as banks and the post office, the first important operation of the window job is to determine which one of the types broadly classified as above has the sheet received.

SUMMARY OF THE INVENTION

Heretofore, since the operation to determine which one of the sheet types broadly classified as above has the sheet received is carried out through a visual check by a clerk at the window, the determination cannot be easily achieved in some cases. When the determination of the sheet type takes a long period of time, the window job is delayed and the service for the clients is lowered.

Particularly, although a financial system of a network configuration which makes retail stores other than the banks and the post office handle the paying-in operation of various public utilities charges is recently being put to practice, salespersons in the retail stores have not received a particularly training and/or schooling in many cases. Therefore, the determination of the various sheet types is extremely difficult or a wrong sheet type is by mistake determined, which leads to a fear that reliability and operation efficiency of the system itself are deteriorated.

It is therefor an object of the present invention, which aims at solving the problem above, to provide a sheet handling system and a sheet filing system in which contents described on various types of sheets are recognized in a short period of time and which can thereby contribute to increase in efficiency of processing of application processing subsequent thereto in a financial institution or the like.

To achieve the object above, there is provided in accordance with the present invention a sheet handling system including terminal equipment disposed in an office of a financial institution or the like and a center apparatus disposed in a financial institution unit or in a store control unit. Image data read by the terminal equipment from a sheet to be processed is received from an image reader and is edited into image data in a predetermined format. The image data is sent to the center apparatus. In the center apparatus, image data of a specified recognition area is separated from the image data received from the terminal equipment, and contents described on the sheet are recognized according to the image data separated. In addition, image data of a specified area is separated from the received image data, and a sheet image corresponding to the image data separated and a result of the recognition are displayed in parallel with each other.

In accordance with the present invention, there is provided a sheet filing system, wherein image data separated and a result of the recognition are edited in a sheet unit and there is included a sheet database for storing a result of the edition.

BRIEF DESCRIPTION OF THE DRAWINGS

The present invention will be more apparent from the following detailed description, when taken in conjunction with the accompanying drawings, in which.

DESCRIPTION OF THE EMBODIMENTS

Figure 1:
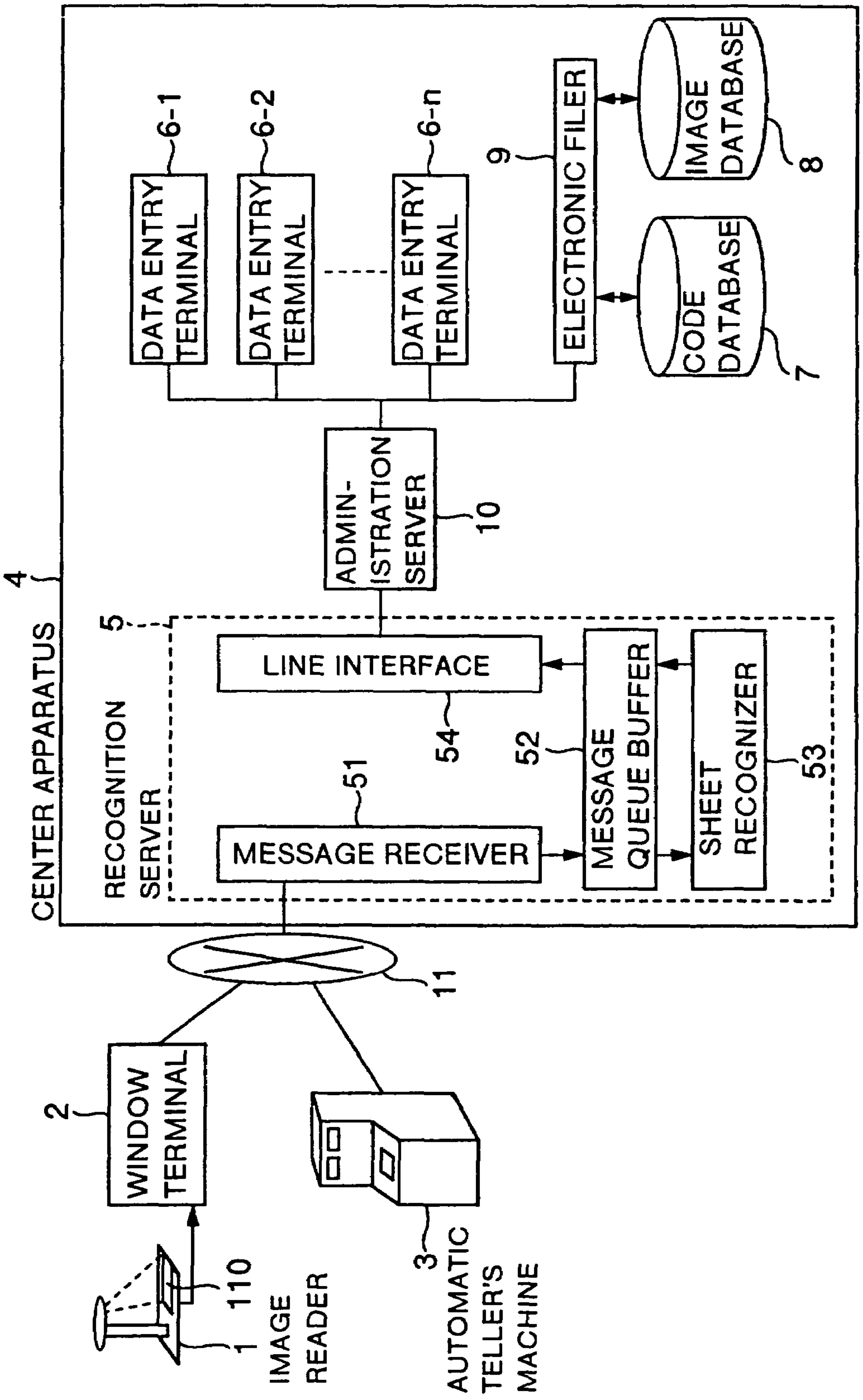
FIG. 1 is a system configuration diagram showing an embodiment of a system in accordance with the present invention.

Next, description will be given in detail of an embodiment of the present invention by referring to the drawings.

FIG. 1 is a system configuration diagram showing an embodiment of a sheet handling system according to the present invention. The system of this embodiment includes an image reader 1 for reading images of characters, symbols, a barcode; a print of a seal, and the like described on a sheet to be processed; a window terminal 2 including a computer such as a personal computer, an automatic teller's machine 3 including a function to read an image of a sheer or the like, and a center apparatus 4 connected via a communication line 11 to window terminal 2 and automatic teller's machine 3.

Center apparatus 4 includes a recognition server 5 for identifying, according to the sheet image data received from window terminal 2 or automatic teller's machine 3, a sheet type of the sheet and for recognizing contents described thereon, a plurality of data entry terminals 6-1 to 6-*n* to be operated by clerks of the financial institution, an electronic filer 9 including a code database 7 and an image database 8, and an administration server 10 for data entry terminals 6-1 to 6-*n* and electronic filer 9 to access a message queue buffer 52 of recognition server 5.

Recognition server 5 includes a message receiver 51 for receiving the sheet image data via communication line 11 from window terminal 2 or automatic teller's machine 3, a message queue buffer 52 for sequentially accumulating a message received and for accumulating the result of the recognition, a sheet recognizer 53 for recognizing a sheet type and contents described on a sheet according to the sheet image data accumulated in the message queue buffer, and a line interface 54 for connecting a line to administration server 10 and for transferring the results of the recognition accumulated in message queue buffer 52 via the administration server to a data entry terminal.

Image reader 1 is so configured to optically scan a sheet 11 placed on a sheet plate, from an upper position oblique with respect to sheet 11, and inputs image data (color image data) obtained to window terminal 2.

Figure 2A:
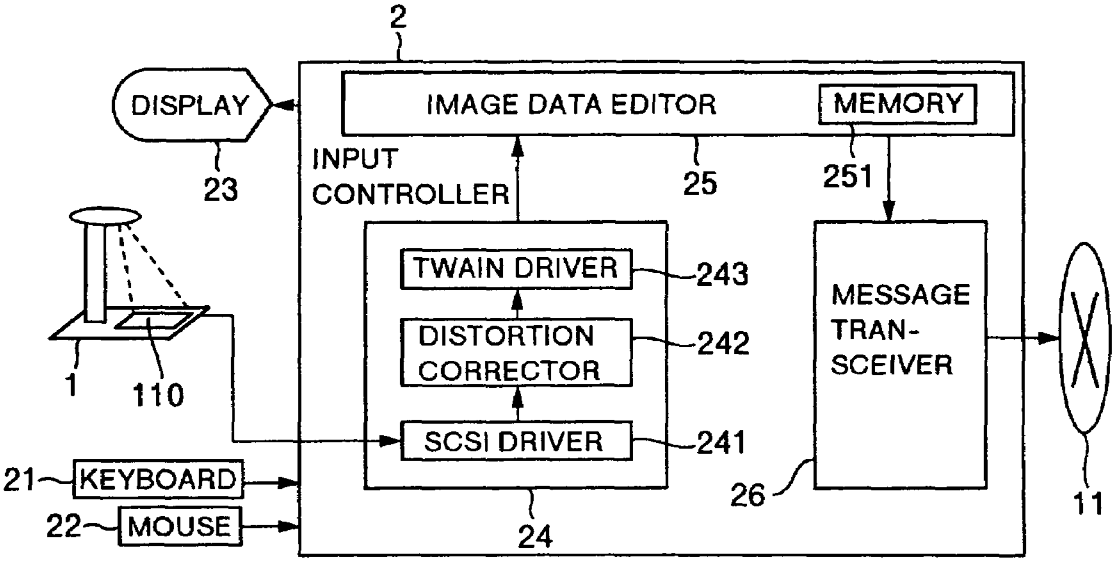
FIGS. 2A to 2C are respectively an internal configuration, a distorted read image, and a layout of a transmission message of a window terminal connected to an image input device.

Window terminal 2 includes, as shown in FIG. 2A, a keyboard 21 associated with terminal 2, a mouse (pointing device) 22, a display 23, an input controller 24, an image data editor 25, and a message transceiver 26.

Figure 2B:
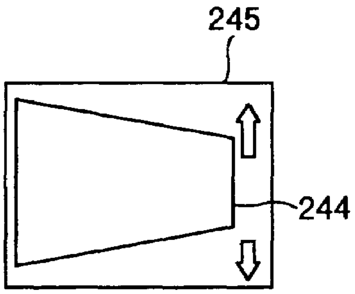

Input controller 21 conducts an input control operation for image reader 1 and includes an SCSI driver 241 to transfer the sheet image data at a high speed, a TWAIN driver 243 as a standard interface of an image scanner, and a distortion corrector 242 to correct distortion of the read image. Since the sheet image read from an upper point oblique thereto is distorted in a trapezoid shape 244 as shown in FIG. 2B, distortion corrector 242 corrects the distorted image to obtain a rectangular image 245. Input controller 24 inputs the sheet image data in a data format stipulated in the TWAIN standards to image data editor 25.

Image data editor 25 edits the sheet image data into image data in a predetermined format, adds an image processing control header to the edited result to produce a transmission message in sheet unit, and sends the message via message transceiver 26 and communication line 11 to recognition server 5.

Figure 2C:
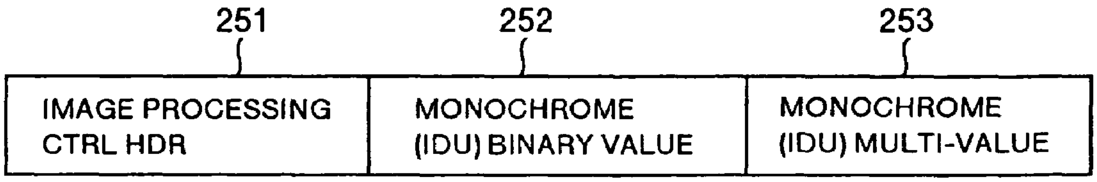

Image data editor 25 edits, as shown in FIG. 2C, the sheet image data into a monochrome binary value (image data unit (IDU) binary value) 252 and a monochrome multi-value (IDU multi-value) 253 and adds an image processing control header 251 thereto to generate one transmission message. Header 251 includes information indicating a transmission destination, a transmission source, an image data format (monochrome/color, binary value/multi-value, compression format), and an attribute.

Figure 3:
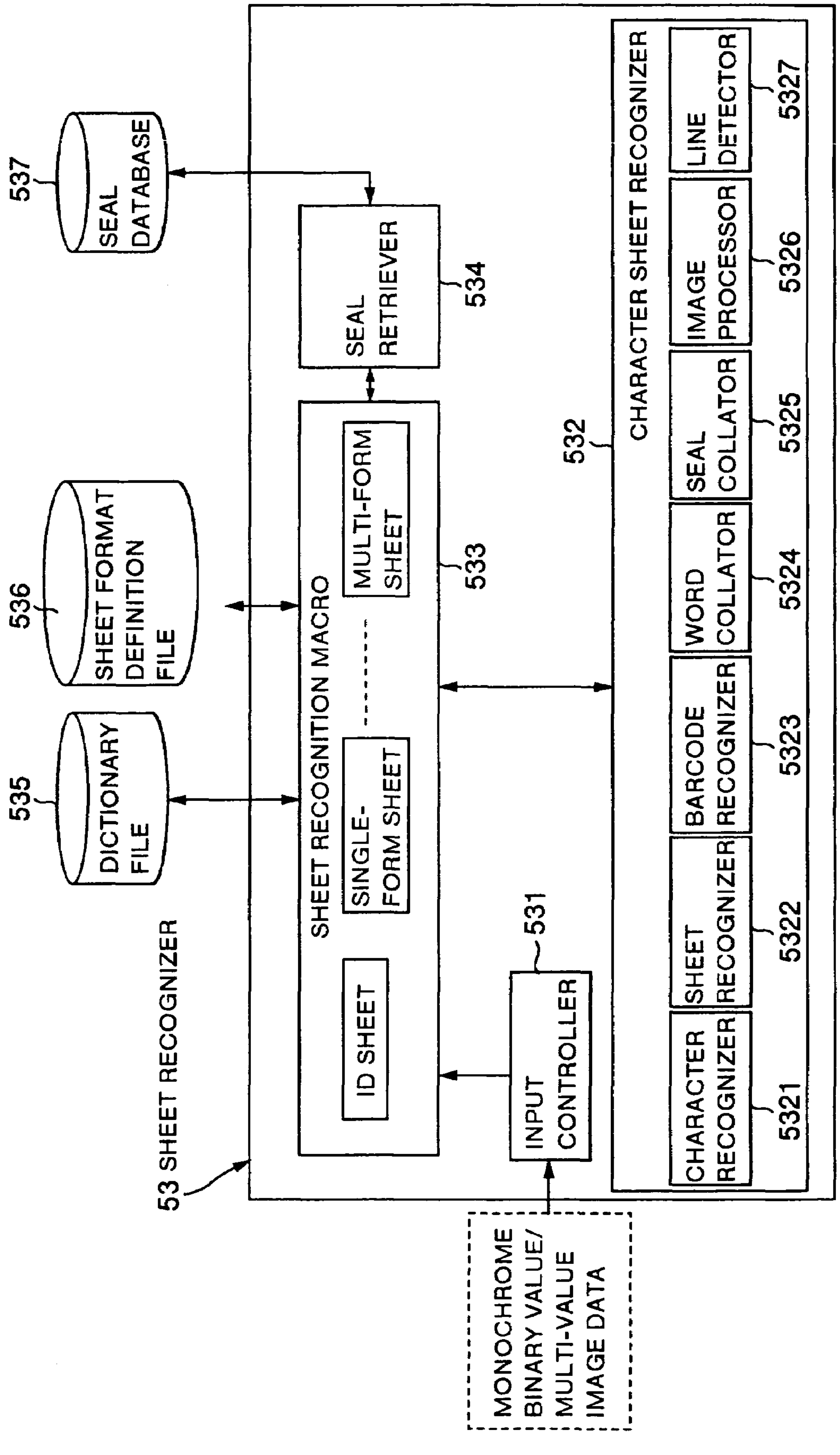
FIG. 3 is a detailed configuration diagram of a sheet recognizer in a recognition server.

Sheet recognizer 53 of recognition server 5 includes, as can be seen from FIG. 3, an input controller 531, a character sheet recognizer 532, a sheet recognition macro 533, a seal retriever 534, a dictionary file 535, a sheet format definition file 536, and a seal database 537. In this regard, seal database 537 may be directly attached to recognition server 5 or may be placed under control of administration server 10.

Sheet recognition macro 533 is a section which identifies, according to the sheet image data inputted from input controller 531, a sheet type; recognizes characters, a barcode, and the like described, and conducts retrieval and collation of a print of a seal. Macro 533 includes macro programs which selectively call respective processing sections of character sheet recognizer 532 to achieve identification of the sheet type, recognition of characters, and collation of a seal print. These macro programs can be set for each type of sheet such as “ID sheet”, “single-form sheet”, or “multi-form sheet”. “ID sheet” is a sheet on which sheet identification code characters (numeric characters) are printed, for example, a sheet formulated by own bank. “Single-form sheet” includes checks, promissory notes, and sheets in a one-form format formulated by a telephone company, an electric power company, and the like. “Multi-form sheet” is a sheet in a format including a plurality of forms. These macro programs for the respective sheet type are initiated in a predetermined order when a message from window terminal 2 is stored in message queue buffer 52, selectively calls respective processing sections of character sheet recognizer 252 to conduct identification of a sheet type, recognition of characters, and separation of image from a necessary part for the operator to confirm the sheet, edits in sheet unit the sheet type, information of characters recognized, and separated image data of a specified area, and stores a result of the edition. The result of recognition and the separated image data of the specified area stored in message queue buffer 52 are transferred in response to requests from data entry terminals 6-1 to 6-*n* or at a fixed interval via administration server 10 to data entry terminals 6-1 to 6-*n*.

Character sheet recognizer 532 includes a character recognizer 5321, a sheet identifier 5322, a barcode recognizer 5323, a word collator 5324, a seal collator 5325, an image processor 5326, a line detector 5327. These processing sections include programs which are selectively initiated by the respective macro programs of sheet recognition macro 533.

Character recognizer 5321 is a section to recognize characters as a recognition object (alphanumeric characters such as an amount and a sheet ID and characters of a personal name) described on a sheet to be processed. When the sheet is identified as a sheet of type including characters to be recognized, recognizer 5321 is initiated by the macro program of sheet recognizer macro 533 which identified the sheet type, and recognizes characters in an area indicated by sheet recognizer 533. Characters to be recognized include characters handwritten, characters printed, OCR characters, and MICR characters.

Sheet recognizer 5322 is a section, which is initiated by sheet recognition macro 533 as above and which identifies a type of a sheet as a recognition object through a matching operation between the sheet image data and definition information registered to sheet format definition file 536 to identify a sheet type. Recognizer 5322 is initiated by each macro program of sheet recognition macro 533 to identify each type of sheet.

In this regard, the sheet types are broadly classified into an ID sheet, a barcode sheet, an OCR sheet, and the like. However, for example, there exist ID sheets having different formats depending on their ID numbers.

This embodiment processes as follows.

(1) An image is separated from an area specified by definition information for sheet type identification, and whether the sheet is an ID sheet, a barcode sheet, or the like is identified.

(2) For an ID sheet, its ID number is recognized and a lower attribute corresponding to the ID number is recognized.

(3) An image is separated from an area specified by definition information for the lower attribute, characters are recognized, and the processing is executed according to a result of the recognition.

According to the present invention, when a sheet type has formats categorized or classified according to an ID number or the like, the categories or classifications are referred to as lower attributes.

The matching operation indicates, when recognizing a barcode and MICR characters printed on a note/check, a pattern matching operation using an image (a barcode pattern image or an MICR character pattern image) and indicates, when recognizing a sheet on which code information of a numeric character string including a plurality of positions is printed, a matching operation in one-character unit or in character string unit.

Barcode recognizer 5323 is a section to recognize a barcode as a recognition object described on a sheet to be processed. When the sheet is identified as a sheet of type including a barcode to be recognized, recognizer 5323 is initiated sheet recognition macro 533.

Word collator 5324 is a section to recognize words (e.g., a bank name, a company name, an address, and a personal name) described as a recognition object on a sheet to be processed. When the sheet is identified as a sheet of a type including words to be recognized, recognizer 5324 is initiated by a macro program of sheet recognition macro 533. Seal collator 5325 is a section to collate a print of a seal disposed as a recognition object on a sheet to be processed with a print of a seal registered to seal database 537. When the sheet is identified as a sheet of a type including a seal print to be recognized, seal recognizer 5325 is initiated by a macro program of sheet recognition macro 533. Image processor 5326 is a section to separate an image such as a seal print to be saved for confirmation by the operator or as a record in a transaction history. When the sheet is identified as a sheet of a type including an image to be separated, image processor 5326 is initiated by a macro program of sheet recognition macro 533.

Line detector 5327 is a section to detect a feature of a line of a table or ruled lines described on a sheet. When the sheet is identified as a sheet of a type including a line of a table of ruled lines, detector 5327 is initiated by a macro program of sheet recognition macro 533 which is associated with the sheet type and which identified the sheet type. Detector 5327 collates a line feature detected with sheet layout information beforehand registered to sheet format definition file 536 to determine a layout of the sheet.

Dictionary file 535 stores a dictionary for word collator 5324 to collate words with each other.

Registered beforehand to sheet format definition file 536 are information of a plurality of sheet types and image separation areas to identify lower attributes thereof and information of recognition objective areas of characters and the seal print on the sheet of each type and separation areas for confirmation by the clerk. Information of definitions to identify types of sheets to be treated and information of format definitions of lower attributes of each type are registered. Contents registered will be described later in conjunction with processing to identify sheet types.

Next, description will be given of a representative example of a sheet processed by the sheet handling system of this embodiment and a display example of a result of recognition.

Figure 4:
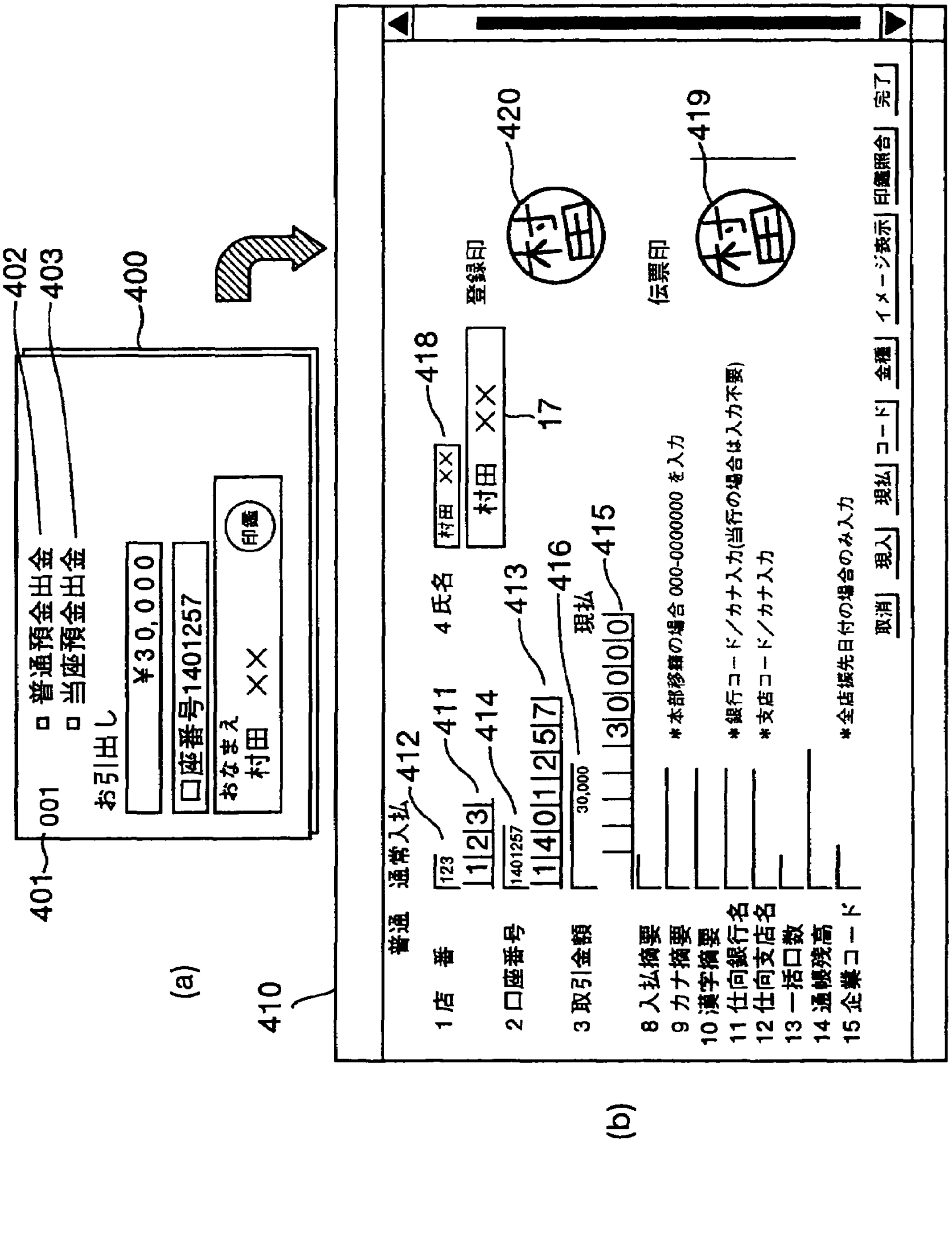
FIG. 4 is a diagram showing an example (a) of a formal sheet of which a sheet format is formulated by a financial institution itself and a display screen example (b) of information read.

FIG. 4 shows an example of a sheet in a format formulated by own bank (to be referred to as a formal sheet herebelow) and a display example of a result of recognition. As shown in FIG. 4(*a*), there are printed on formal sheet 400 are an ID ("001" in the example of FIG. 4) and check boxes 402 and 403 to identify a transaction type or a transaction mode (check box "□" for "01 普通預金口座出金 (Saving account withdrawal))" and "02 当座預金出金 (Checking account withdrawal)" in the example of FIG. 4). If formal sheet 400 is for withdrawal from a savings account, a client fills in check box 402 with a check code of "✓". In subsequent fields, the client writes a withdrawal amount "¥30,000" and an account number "1401257"; moreover, a name of the client "村田 (Murata) XX" is described in a "おなまえ (personal name)" field and a seal is affixed. Although formal sheet 400 of FIG. 4(*a*) actually includes a handwritten character field of "店番 (branch number)", the field is not shown in this example.

When formal sheet 400 is read, a result of recognition is displayed as shown in FIG. 4(*b*) in a confirmation screen 410 of data entry terminals (6-1 to 6-*n*). Displayed on confirmation screen 410 are a separation image 411 of branch number "123" handwritten and a result of recognition thereof 412 (not shown in FIG. 4(*a*)), a separation image 413 of an account number "1401257" handwritten and a result of recognition thereof 414, a separation image 415 of a transaction amount "30000" handwritten and a result of recognition thereof 416, a separation image 417 of a name "村田 (Murata) XX" handwritten and a result of recognition thereof 418, and a separation image of a seal print 419 printed on formal sheet 400 and a seal print 420 registered to seal database 537.

Figure 5:
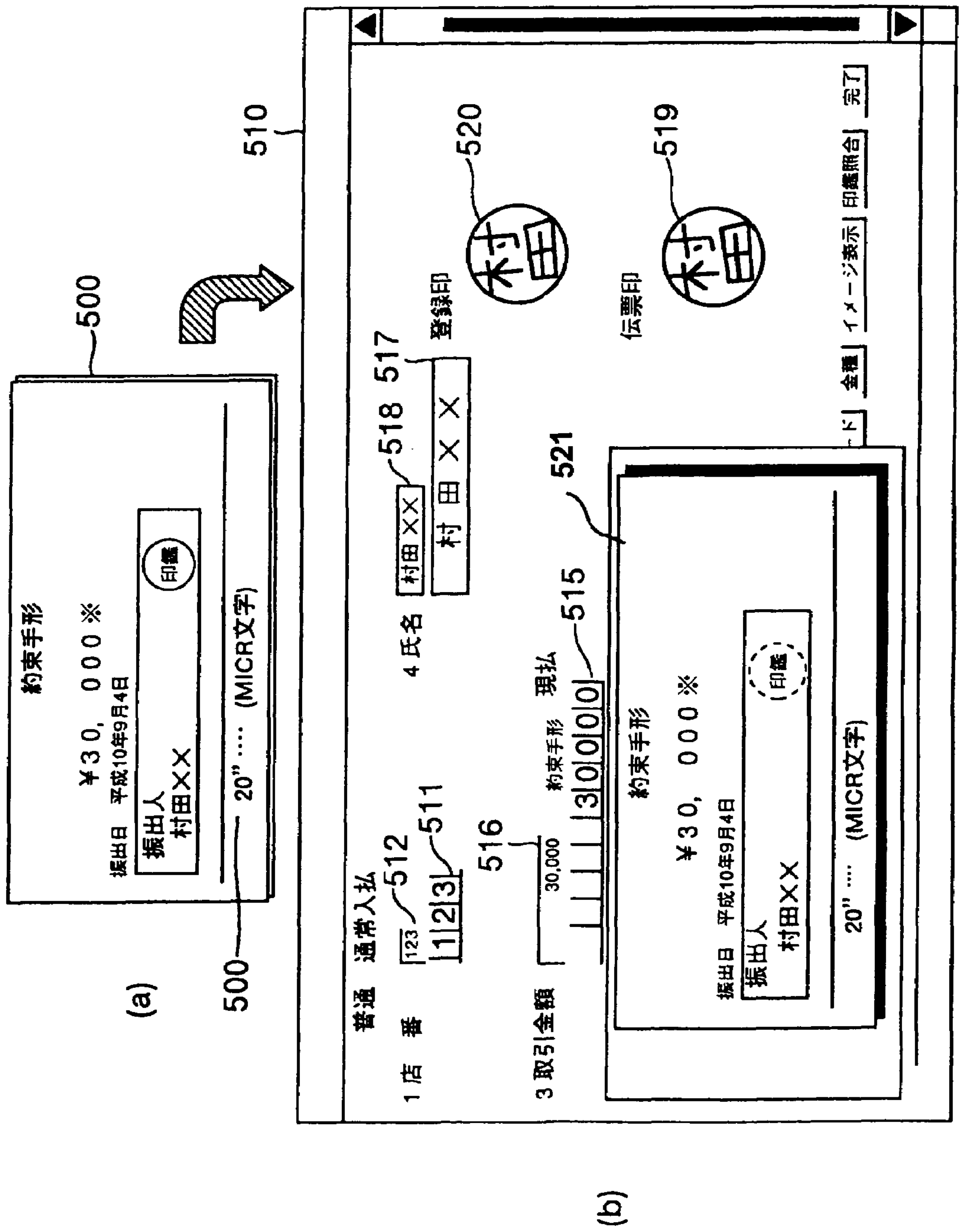
FIG. 5 is a diagram showing an example (a) of a promissory note as a processing object and a display screen example (b) of information read.

FIG. 5 shows an example of a promissory note and a display example of a result of recognition. As shown in FIG. 5(*a*), there are printed on a promissory note 500 magnetic ink character recognition (MICR) characters 501 which are stipulated by a law and are unique to note 500. Consequently, whether or not MICR characters 501 of a predetermined font pattern are printed at a predetermined position is identified by a pattern matching operation with an MICR character pattern image. When it is identified that the note has a legal format, necessary sections are recognized and images thereof are separated, and a confirmation screen 510 is displayed as shown in FIG. 5(*b*).

Displayed on confirmation screen 510 shown in FIG. 5(*b*) are a separation image 511 (not shown in FIG. 5(*a*)) of printed characters "123" of "店番 (branch number)" of a bank as a domicile and a recognition result of the characters 512, a separation image 515 of a transaction amount "¥30,000" printed by a checkwriter and a recognition result of the amount 516, a separation image 517 of a issuer name "村田 (Murata) XX" handwritten and a result of recognition thereof 518, a separation image 519 of a print of a seal 519 of the issuer printed on note 500 and a result of recognition thereof 520, and a minimized image 521 of the overall image of note 500. Minimized image 521 is separated because it is necessary to save evidence to cope with a case in which a failure occurs in the processing or in which an enquiry is received from a client.

Figure 6:
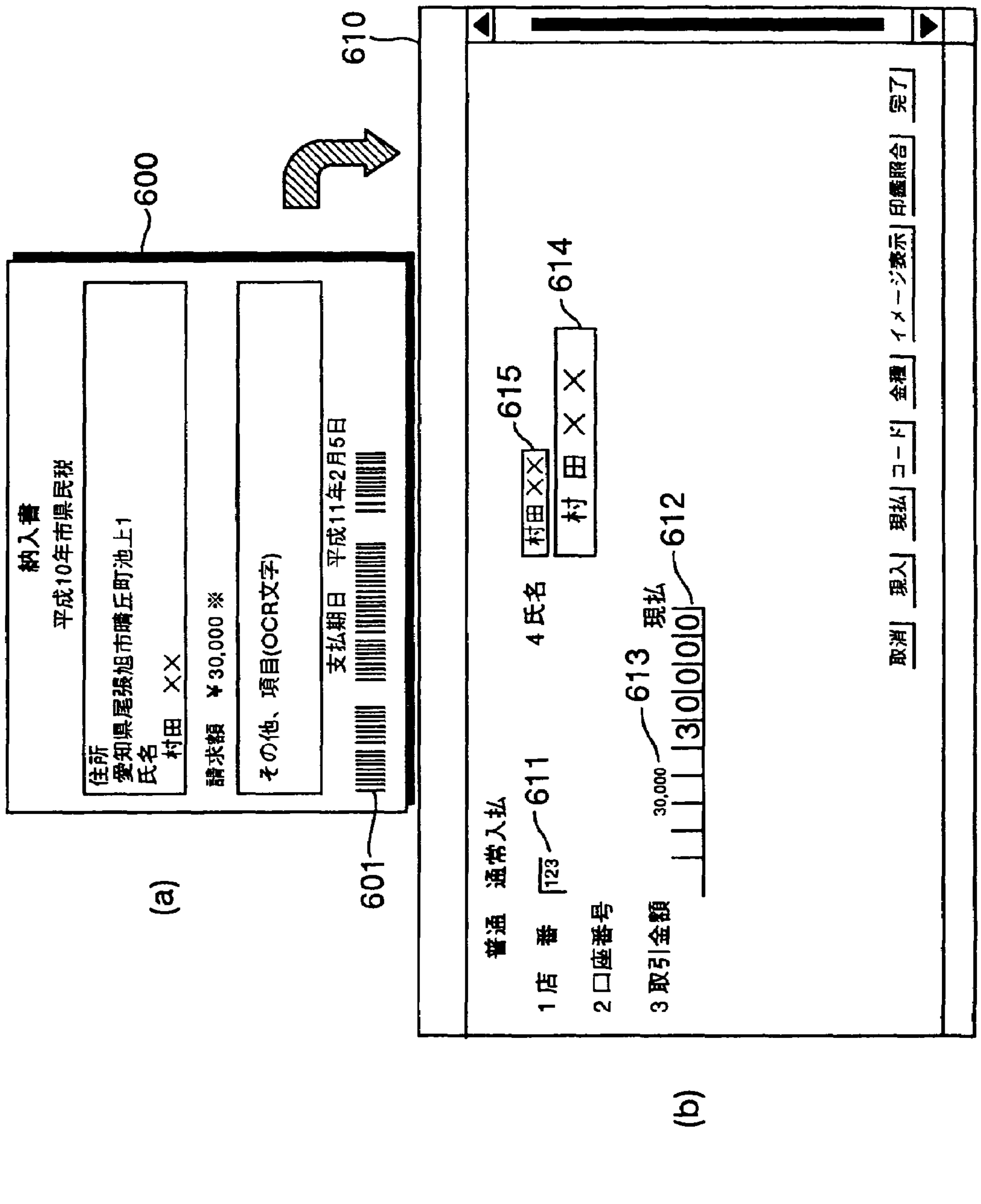
FIG. 6 is a diagram showing an example (a) of a barcode sheet formulated by a local government or the like and a display screen example (b) of information read.

FIG. 6 shows an example of a paying-in sheet of municipal/prefectural citizen tax on which a barcode is printed and a display example of a result of recognition. Some paying-in sheets of city/prefecture tax illustratively shown in FIG. 6 have a format as shown in (a) of FIG. 6 in which barcodes of a local government name and a paying-in account number are printed. Such a sheet is herebelow defined as a barcode sheet. In accordance with the present invention, an image of an area defined by information of definition to identify a barcode sheet is separated and then whether or not a barcode is described in the area is identified by a pattern matching operation. When it is detected that the area is a barcode description area, the sheet is identified as a barcode sheet and then a branch number of a financial institution to which the tax is paid and the like are recognized according to contents the barcode (a result obtained by encoding the barcode). Thereafter, images of necessary areas of a personal name, an amount, and the like are separated and characters thereof are recognized, and a result of recognition is displayed in a confirmation screen 610 as shown in FIG. 6(*b*). Displayed in confirmation screen 610 of FIG. 6(*b*) are a recognition result 611 of a "店番 (branch number)" of a bank to which the tax is paid, a separation image 612 of a transaction amount "¥30,000" printed or handwritten and a result of character recognition thereof 613, and a separation image 614 of a tax payer name "村田 (Murata) XX" printed or handwritten and a result of recognition thereof 615.

Figure 7:
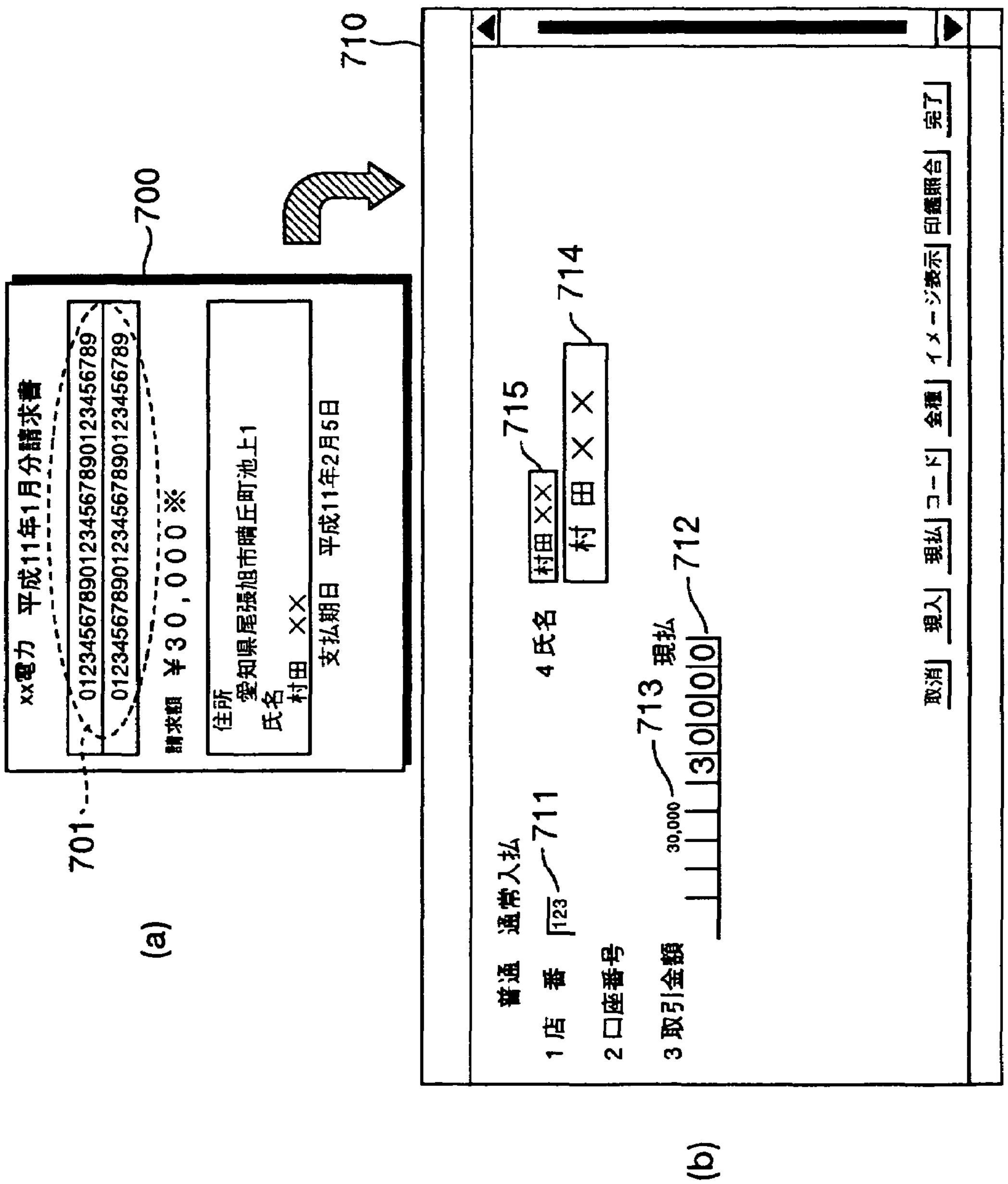
FIG. 7 is a diagram showing an example (a) of a formal sheet formulated by a company or the like and a display screen example (b) of information read.

FIG. 7 shows an example of a charge paying-in sheet on which a symbol code of an electric power company or the like is described with a numeric code including a plurality of positions and a display example of recognition. Some charge paying-in sheets 700 of an electric power company "XX 電力 (electric power)" have a format as shown in FIG. 7(*a*) in which a symbol code or the like unique to the electric power company is printed with a numeric code including a plurality of positions. Such a sheet is herebelow defined as an MT sheet. In accordance with the present invention, an image of an area defined by information of definition to identify an MT sheet is separated from MT sheet 700 above, and then whether or not a numeric code including a plurality of positions is described in the area is identified by character recognition. Thereafter, when an area in which numeric code 701 having a plurality of positions is detected, the sheet is identified as an MT sheet and then a symbol code of the electric power company to which the tax is paid and the like are recognized according to contents the numeric code. Images of necessary areas are then separated and characters thereof are recognized, and a result of recognition is displayed in a confirmation screen 710 as shown in FIG. 7(*b*). Displayed in confirmation screen 710 of FIG. 7(*b*) are a recognition result 711 of a "店番 (branch number)" of bank to which the tax is paid, a separation image 712 of a transaction amount "¥30,000" printed or handwritten and a result of character recognition thereof 713, and a separation image 714 of a tax payer name "村田 (Murata) XX" handwritten and a result of recognition thereof 715. Incidentally, sheets used in a postal transfer MT service are comprehensively referred to as "MT sheet". The postal transfer MT service is a service in which notification of contents of a postal transfer payment (OCR character data beforehand written by a subscriber on an MT service paying-in sheet) is recorded on a magnetic tape or a floppy disk to be passed to the subscriber, not in the form of a image output paying-in sheet sent by mail.

Figure 8:
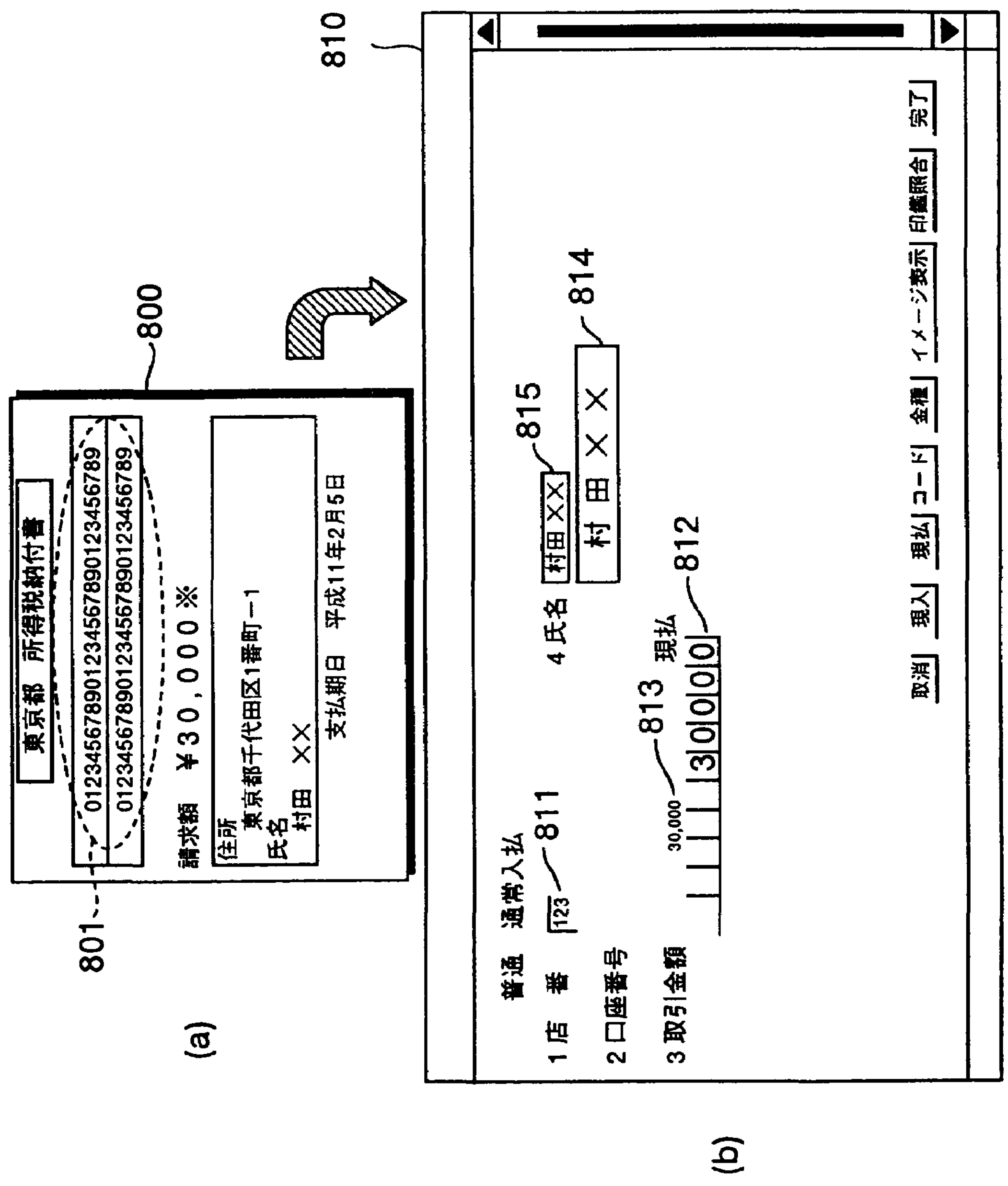
FIG. 8 is a diagram showing an example (a) of an OCR sheet formulated by a local government or the like and a display screen example (b) of information read.

FIG. 8 shows an example of a tax paying sheet on which a symbol code of a local government or the like is described with a numeric code including a plurality of positions and a display example of recognition. Some income tax paying-in sheets 800 of local government "東京都 (Tokyo Metropolis)" have a format as shown in FIG. 8(*a*) in which a symbol code or the like unique to the local government is printed with OCR characters 801 including a plurality of positions. Such a sheet is herebelow defined as an OCR sheet 800. OCR sheet 800 is processed in a similar manner as for sheet 700 of FIG. 7. That is, an image at a position defined by information of definition to identify an OCR sheet is separated from OCR sheet 800 of FIG. 8, and then whether or not OCR characters including a plurality of positions are described in the separation image is identified by character recognition. Thereafter, when OCR characters 801 having a plurality of positions are detected, the sheet is identified as an OCR sheet and then a symbol code or the like of the local government to which the tax is paid is recognized according to contents of the numeric code (a result of recognition of numeric characters). Images of necessary areas are then separated and characters thereof are recognized, and a result of recognition is displayed in a confirmation screen 810 as shown in FIG. 8(*b*). Displayed in confirmation screen 810 of FIG. 8(*b*) are a recognition result 811 of a "店番 (branch number)" of bank to which the tax is paid, a separation image 812 of a transaction amount "¥30,000" printed or handwritten and a result of character recognition thereof 813, and a separation image 814 of a tax payer name "村田 (Murata) XX" printed or handwritten and a result of recognition thereof 815.

Figure 9:
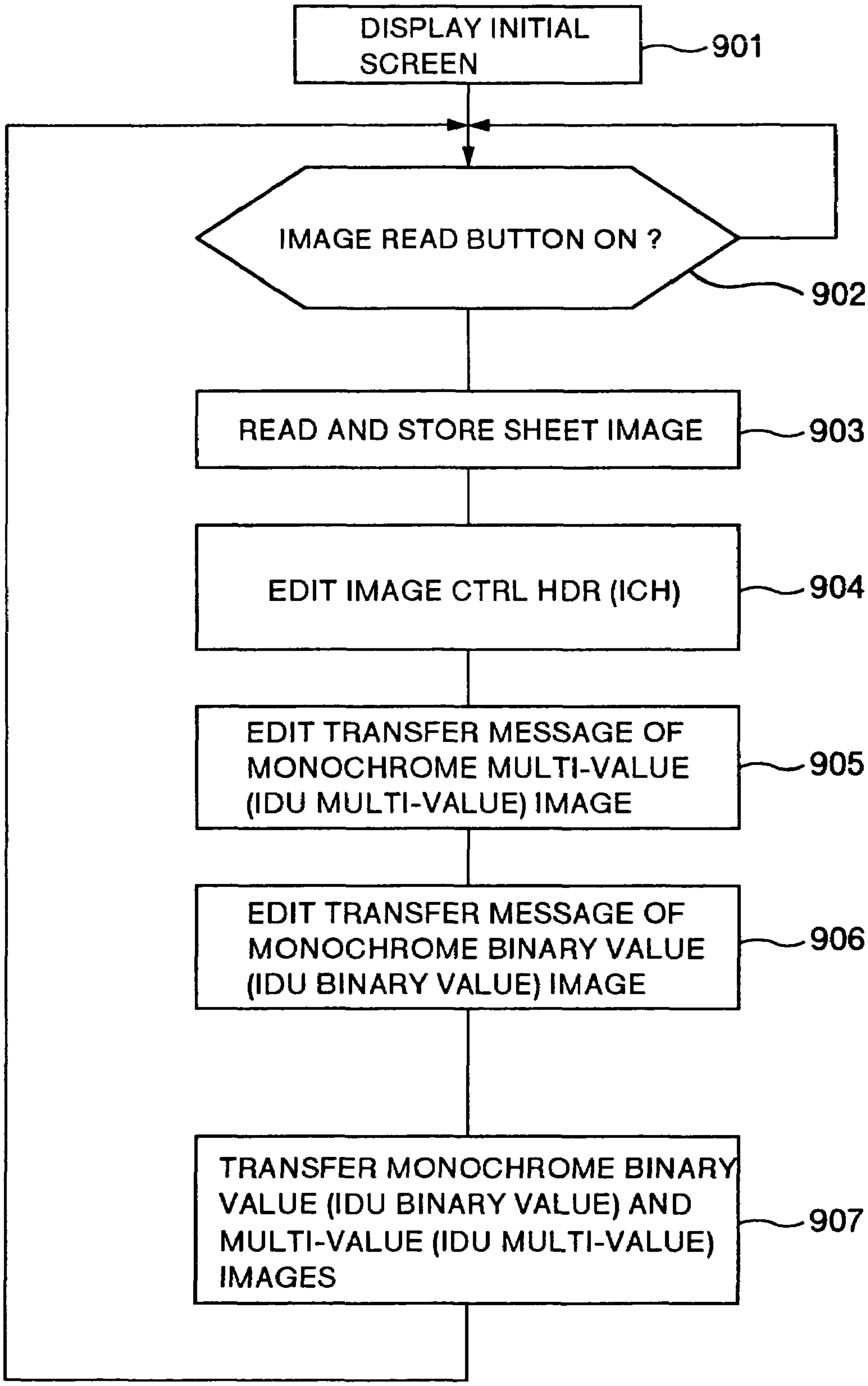
FIG. 9 is a flowchart showing a procedure of an image reading and editing operation of a window terminal.
Figure 10:
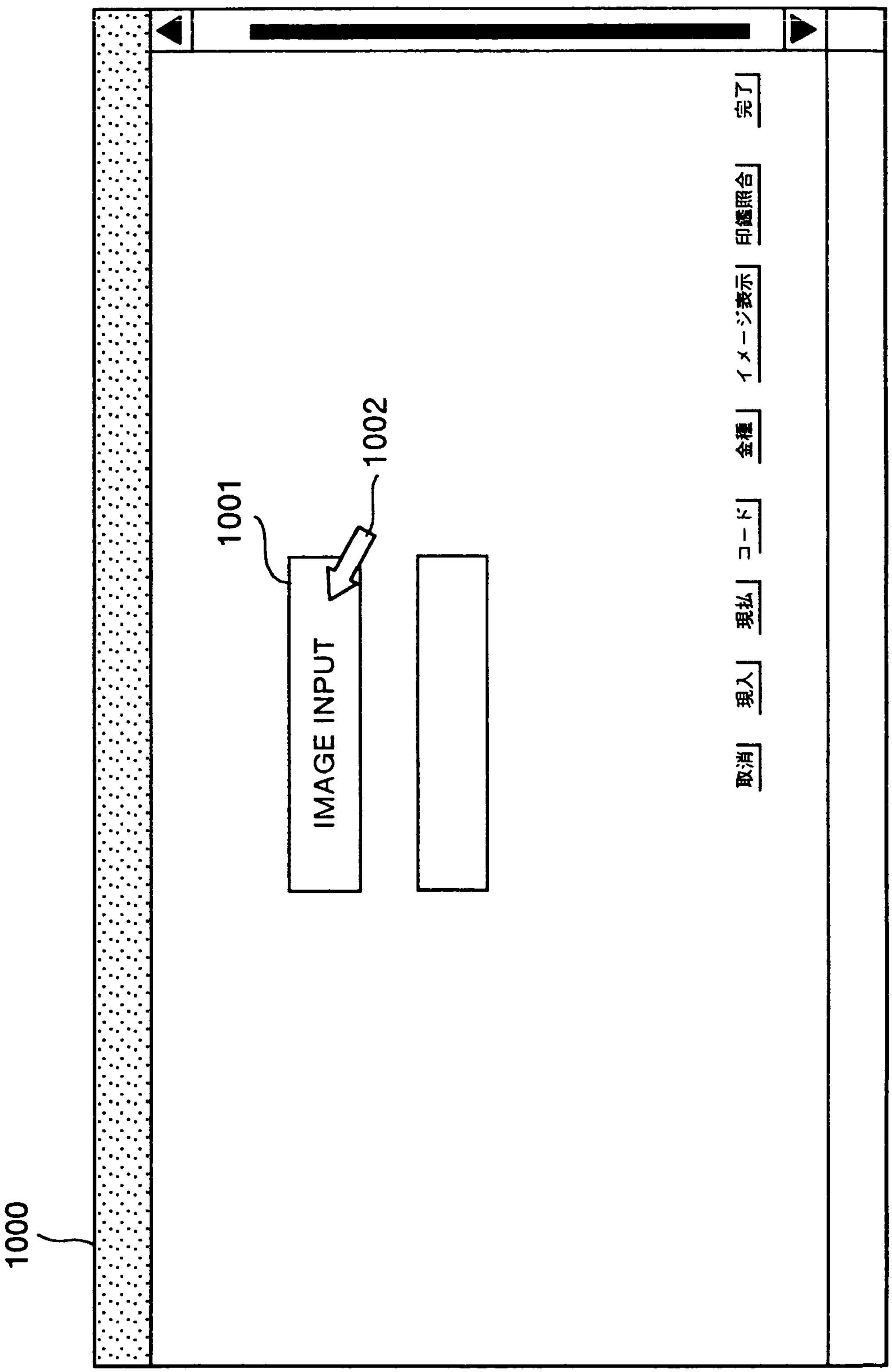
FIG. 10 is a diagram showing an example of an initial screen of a sheet reading operation.

FIG. 9 is a flowchart showing an image reading and editing operation of image editor 25 in window terminal 2. First, when window terminal 2 is activated, an initial screen 1000 is displayed as shown in FIG. 10 (step 901). The operator then places a sheet as a processing object on a sheet plate of image reader 1 and operates an image input start button 1001 of initial screen 1000 by clicking mouse 22 to input an image input command. Alternatively, the operator inputs an image input start command from keyboard 21.

Having recognized an input of the image input start command (step 902), image data editor 25 of window terminal 2 sends a read start signal via input controller 24 to image reader 1. In response thereto, image reader 1 starts a reading operation of a sheet image. Image reader 1 transfers sheet image data thus obtained to image data editor 25 via input controller 24. Editor 25 stores in a memory 252 the sheet image data transferred (step 903). Thereafter, editor 25 edits an image processing control header (ICH; step 904).

The image processing control header includes information indicating a transmission destination (transmission destination network address), a transmission source (transmission source network address), an image data format (monochrome/color, binary value/multi-value, a compression format), and an attribute.

Next, editor 25 reads the sheet image data (color image data) stored in memory 251, transforms the data into a monochrome multi-value image (IDU multi-value), and edits the monochrome multi-value image as a part of a transfer message (step 905). Additionally, editor 25 transforms the data into a monochrome binary-value image (IDU binary value), and then edits the monochrome binary value image as a part of a transfer message (step 906). Editor 25 then edits the image processing control header, the monochrome multi-value image (IDU multi-value), and the monochrome binary value image (IDU binary value) into one transfer message as shown in FIG. 2(*c*) and transmits the message via message transceiver 26 and communication line 11 to recognition server 5 (step 907).

The monochrome binary value image is used by recognition server 5 for the recognition. The monochrome multi-value image is used by the clerk for the seal collation on the side of recognition server 5. That is, for a seal part of the sheet handled by window terminal 2, data is transformed into a monochrome multi-value image. For other parts, data is converted into a monochrome binary value image. Data including the monochrome multi-value binary-value images is transmitted from the window terminal side to the center apparatus side including the recognition server and the data entry terminals. When compared with a case in which all data is sent in the format of a monochrome multi-value image, the amount of data to be transmitted is advantageously decreased. Moreover, on the center side, the image obtained is clear and hence the clerk can easily achieve the seal collation.

Window terminal 2 repeatedly conducts the operation above for each sheet and sends image data read from the sheet as a processing object to recognition server 5.

On the other hand, having received the transfer message including the image processing control header, the monochrome multi-value image (IDU multi-value), and the monochrome binary value image (IDU binary value) by message receiver 51, recognition server 5 stores the message received, in a reception area of message queue buffer 52 (step 1101). When a notification that a new message received is stored is received from message receiver 51, sheet recognizer 53 reads the message from the reception area of buffer 52, confirms the image data format by analyzing the image processing control header (ICH; step 1102), and reads monochrome multi-value image data and monochrome binary value image data (steps 1103 and 1104).

Thereafter, image editor 25 recognizes characters on the sheet according to the monochrome multi-value image and separates sheet images from areas specified (step 1105). Editor 25 separates sheet images of specified areas according to monochrome binary value image, recognizes characters in the areas separated, and stores a result of recognition thereof and the image data separated from the monochrome multi-value image paired with the recognition result in a transmission area of message queue buffer 52 for each sheet (step 1106). The image separation and recognition will be described in detail by referring to FIG. 12.

Editor 25 then determines whether or not a transfer request has been received from any one of the data entry terminals (step step 1107). If such a request has been received, editor 25 determines whether or not data of a field image and a recognition result which is to be transmitted exists in the transmission area of message queue buffer 52 (step 1108). If the data is present, editor 25 transfers the data to a data entry terminal as the data transfer request source (step 1109). In this situation, it is to be understood that a destination address of the transfer request source is added before transmission. However, if data to be transmitted is absent, editor 25 returns a response of no data (step 1110).

In the operation above, a character recognition result and image data separated from the monochrome multi-value image are transferred to the transfer request source in response to a transfer request from a data entry terminal. However, it is also possible to dispose a message queue buffer in administration server 10 such that when the recognition is finished, the items above are automatically transferred to the message queue buffer in administration server 10 and are then transferred from administration server 10 to the data entry terminal.

Figure 11:
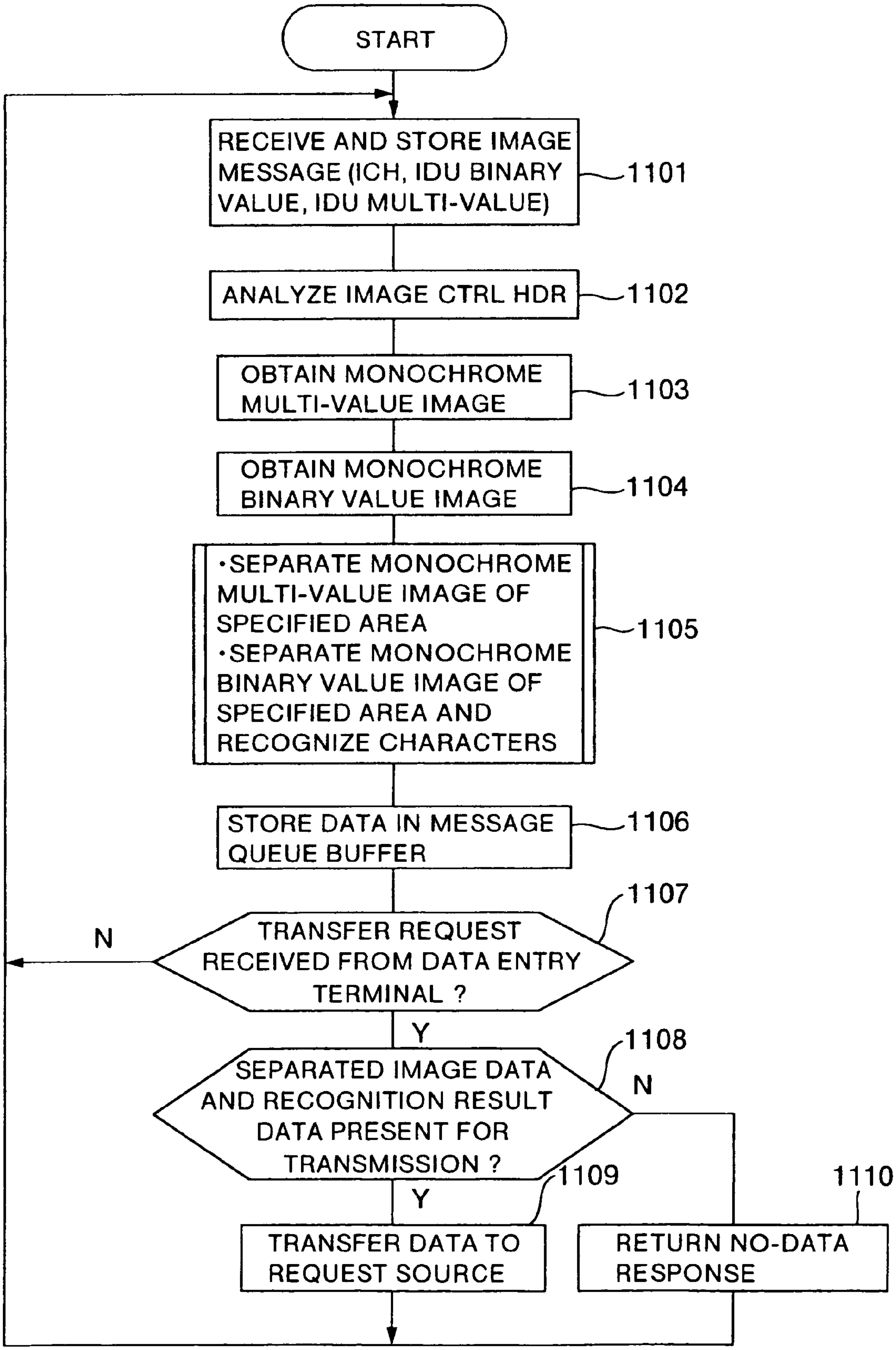
FIG. 11 is a flowchart showing a procedure to recognize contents of a sheet.
Figure 12:
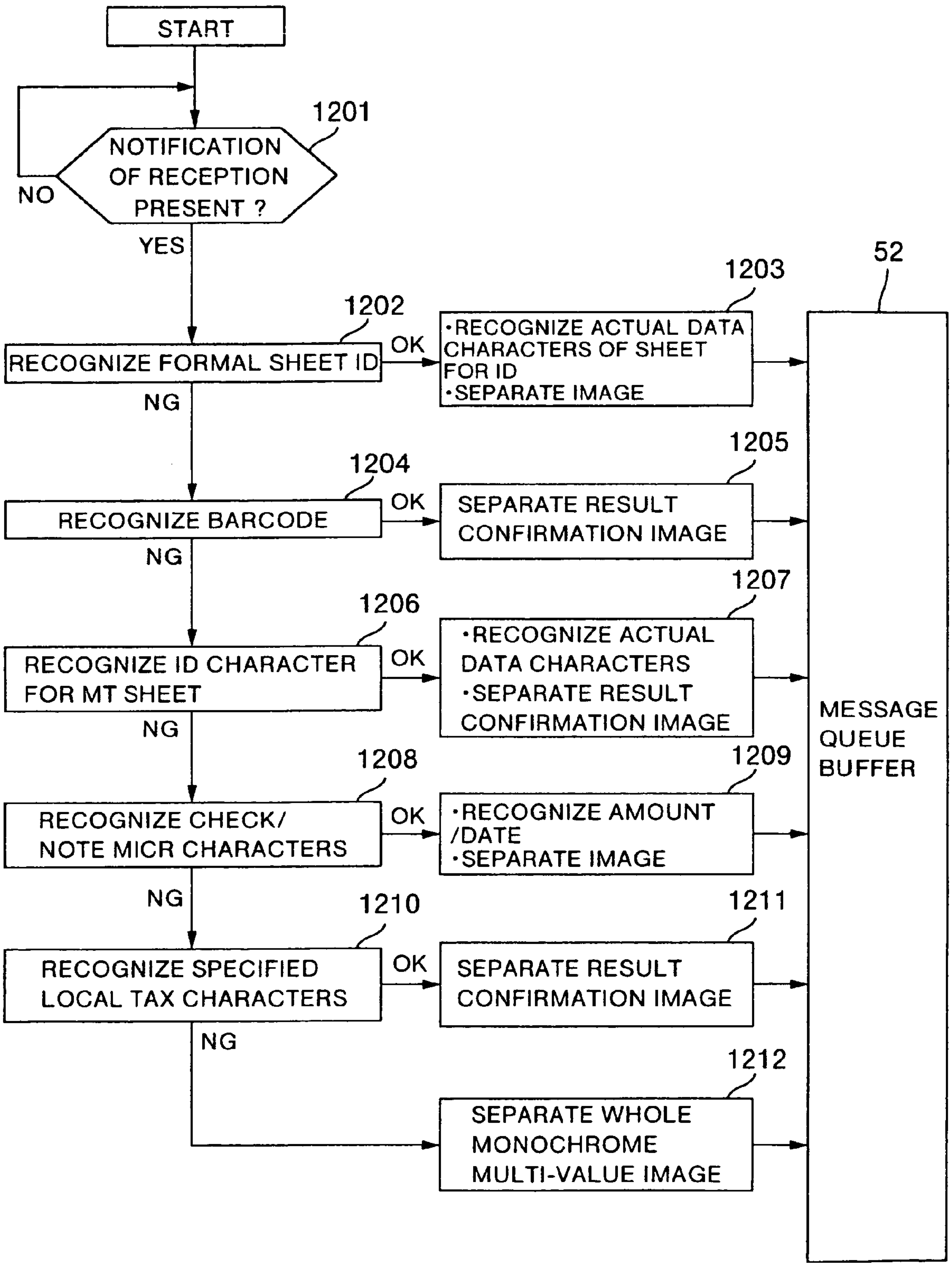
FIG. 12 is a flowchart showing details of step 1105 of FIG. 11.

FIG. 12 shows in a flowchart details of step 1105 of FIG. 11, namely, details of the image separation and character recognition of sheet recognizer 53.

Having received a notification of reception of a new message from message receiver 51 (step 1201), sheet recognition macro 533 of sheet recognizer 53 reads the message via input controller 531 from message queue buffer 52.

Recognition macro 533 then extracts monochrome multi-value image data and monochrome binary value image data from the message read, separates image data from areas specified of the monochrome multi-value image data, separates image data from areas specified of the monochrome binary value image data, and recognizes characters therein.

In this operation, a sheet type of the sheet as the processing object is identified in a predetermined sequence. For example, the identification is sequentially carried out in an order of a formal sheet (FIG. 4), a barcode sheet (FIG. 6), an MT sheet (FIG. 7), a check/note in the form of an MICR sheet (FIG. 5), an OCR sheet of a local government (FIG. 8), other sheets of which layouts are beforehand registered to sheet format definition file 7.

That is, sheet recognition macro 533 initiates macro programs in an order of a macro program to identify a format sheet, a macro program to identify a barcode sheet, a macro program to identify an MT sheet, a macro program to identify a check/note, a macro program to identify an OCR format sheet of a local government, and a macro program to identify a layout sheet.

The formal sheet is set to a first priority level because it is predictable that the formal sheet has a largest input quantity among the sheets. However, the order can be changed by altering the initiation order of macro programs for the respective sheet types by sheet recognition macro 533. When the types of sheets to be processed are increased, it is only necessary to add a macro program for the pertinent sheet, namely, it is not required to change the configuration of character sheet recognizer 532.

First, a macro program of sheet recognition macro 533 is initiated for a formal sheet as a sheet with an ID, and then the macro program initiates character recognizer 5321, sheet identifier 5322, word collator 5324, seal collator 5325, and image processor 5326 of character sheet recognizer 532 to identify whether or not the sheet type indicates a formal sheet. If it is determined that the sheet is a formal sheet on which a sheet ID is printed (step 1202), the macro program separates images of areas beforehand specified by sheet format definition information corresponding the formal sheet of the sheet ID and recognizes characters (an account number, a client name, a transaction amount, and the like). The macro program further separates images of areas beforehand specified by sheet format definition information such as a print of a seal (step 1203) and then stores a result of the separation (characters recognized, images separated, and information of a sheet type) in a transmission area of message queue buffer 52.

However, if it is determined that the sheet is other than a formal sheet, a macro program of sheet recognition macro 533 is initiated for a barcode sheet, and then the macro program initiates character recognizer 5321, sheet identifier 5322, barcode recognizer 5323, word collator 5324, seal collator 5325, and image processor 5326 of character sheet recognizer 532 to identify whether or not the sheet is a barcode sheet (step 1204). If it is determined that the sheet is a barcode sheet on which a barcode is printed, the macro program separates images of areas beforehand specified by sheet format definition information corresponding the barcode sheet and recognizes characters in the images separated (a client name, a transaction amount, and the like). The macro program further separates images of areas beforehand specified by sheet format definition information (characters handwritten and printed; step 1205) and then stores a result of the operation (information of characters recognized, images separated, and a sheet type) in a transmission area of message queue buffer 52.

However, if it is determined that the sheet is other than a barcode sheet, a macro program of sheet recognition macro 533 is initiated for an MT sheet, and then the macro program initiates character recognizer 5321, sheet identifier 5322, word collator 5324, seal collator 5325, and image processor 5326 of character sheet recognizer 532 to identify whether or not the sheet is an MT sheet according to a numeric code string (step 1206). If it is determined that the sheet is an MT sheet, the macro program separates images of areas beforehand specified by sheet format definition information corresponding the MT sheet and recognizes characters (a client name, a transaction amount, and the like). The macro program further separates images of areas beforehand specified by sheet format definition information (characters handwritten and printed; step 1207) and then stores a result of the operation (information of characters recognized, images separated, and information of a sheet type) in a transmission area of message queue buffer 52.

However, if it is determined that the sheet is other than an MT sheet, whether or not the sheet is a check or a note (a promissory note or a bill of exchange) is identified according presence or absence of MICR characters (step 1208). If it is determined that the sheet is a note or a check, the macro program separates images of areas beforehand specified by sheet format definition information corresponding the MICR characters printed on the note or check and recognizes characters in the images separated (a branch number of bank as a domicile, a client name, a transaction amount, and the like). The macro program further separates images of areas beforehand specified by sheet format definition information such as a print of a seal, generates a minimized image of the overall note or check (step 1209), and stores a result of the operation (information of characters recognized, images separated, and a sheet type, and the minimized image) in a transmission area of message queue buffer 52.

However, if it is determined that the sheet is neither a note nor a check, a macro program of sheet recognition macro 533 is initiated for an OCR sheet for a local tax paying-in or the like, and then the macro program initiates character recognizer 5321, sheet identifier 5322, word collator 5324, seal collator 5325, and image processor 5326 of character sheet recognizer 532 to identify whether or not the sheet is an OCR sheet by recognizing OCR characters of a plurality of positions (step 1210). If it is determined that the sheet is an OCR sheet, the macro program separates images of areas beforehand specified by sheet format definition information corresponding to the OCR characters printed on the OCR sheet and recognizes characters (a client name, a transaction amount, and the like). The macro program further separates images of areas beforehand specified by sheet format definition information (characters handwritten and printed; step 1211) and then stores a result of the operation (information of characters recognized, images separated, and a sheet type) in a transmission area of message queue buffer 52.

However, if the sheet is none of the sheets above, a flag of the condition is added to the monochrome binary value data and the monochrome multi-value data and resultant data is stored in a transmission area of message queue buffer 52. This is conducted for the clerk at the data entry terminal to determine the contents of the sheet by visual recognition.

Figure 14:
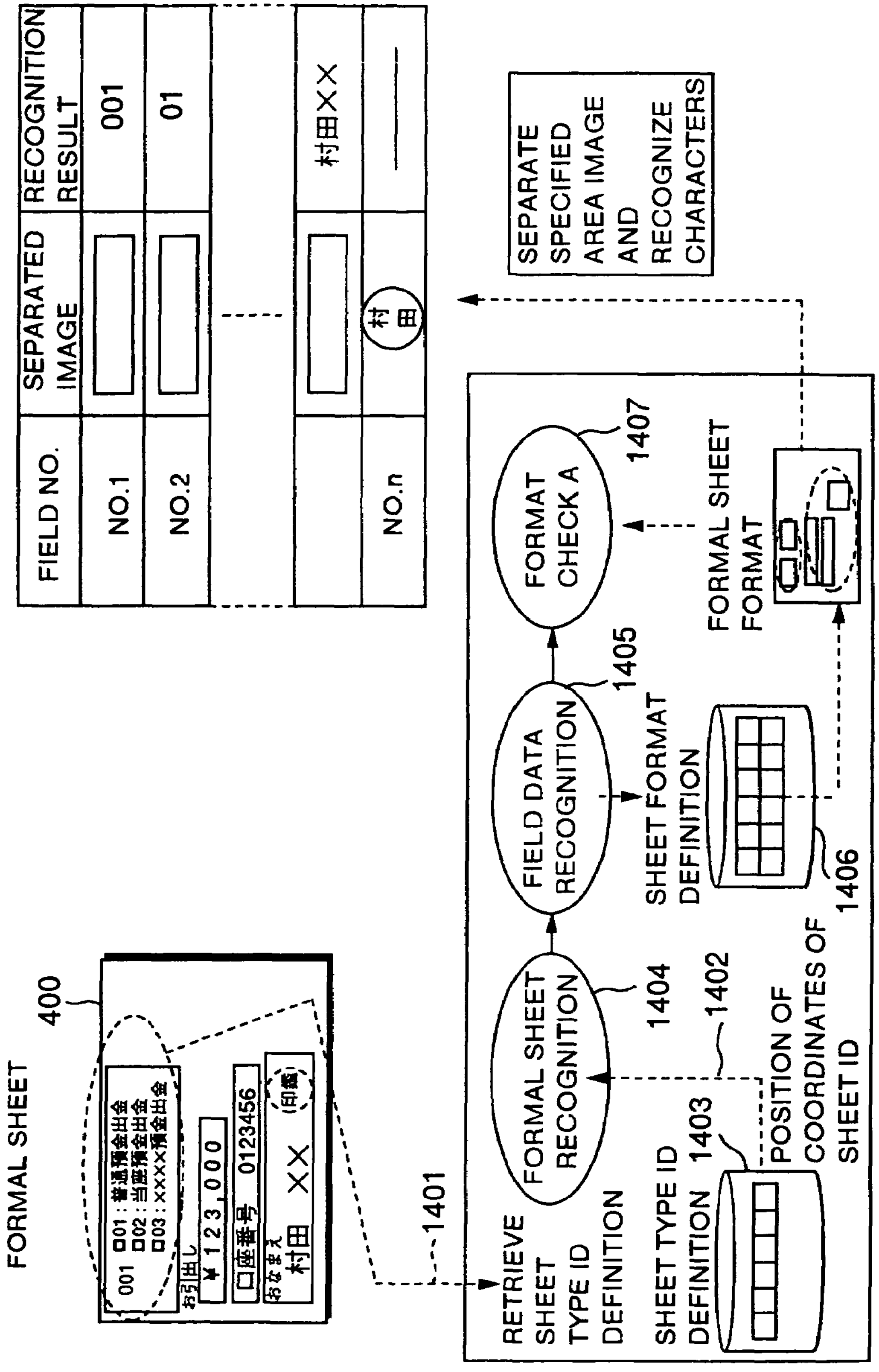
FIG. 14 is a diagram showing details of a sheet handling procedure in a format form of FIG. 4.

FIG. 14 is a diagram showing in detail a processing procedure to identify whether or not a sheet as a processing object is formal sheet 400 illustrated in FIG. 4. First, image processor 5326 separates images of printed areas of ID 401 and check boxes 402 and 403 from sheet type identifying definition 1403 stored in sheet format definition file 536. Thereafter, a check is made to determine presence or absence of ID 401, characters of check boxes 402 and 403, and symbol "□" marked with symbol "✓" in the separated images. That is, since sheet ID 401 and characters of check boxes 402 and 403 and "普通預金出金 (savings account withdrawal)" are printed at specified positions on formal sheet 400, data of coordinates indicating character printed areas of sheet ID 401 and characters of check boxes 402 and 403 and "普通預金出金 (savings account withdrawal)" are stored as definition information 1403 to identify sheet types for each formal sheet in sheet format definition file 536.

Processing is then executed as follows.

(1) The program separates, from image data read from the sheet to be processed, images of coordinate areas indicated by the coordinate data to make a check to determine presence or absence of sheet ID 401, symbols "□" of check boxes 402 and 403, characters of "普通預金出金 (savings account withdrawal)", and symbol "□" marked by symbol "✓" (step 1401, 1402). If these items are present, the program recognizes, by sheet identifier 5322 of FIG. 3, that the sheet to be processed is formal sheet 400 (step 1404) and goes to processing (step 1405) to recognize data (field data) of characters and images in areas to be recognized in the formal sheet 400. In this stage, if the sheet is an example of formal sheet 400 of FIG. 4, it is determined that sheet ID is "001" and the transaction type or mode is "普通預金出金 (savings account withdrawal)". Namely, it is known that the sheet to be processed is a formal sheet and it lower attribute is sheet ID="001". The field data includes image data in areas requiring visual confirmation by the clerk at data entry terminals 6-1 to **6-*n*** and image data in areas of which characters are to be recognized.

(2) In field data recognition 1405, the program first obtains sheet format definition information 1406 corresponding to formal sheet 400 having sheet ID "001", separates by image processor 5326 images of areas specified information 1406, and recognizes by character recognizer 5321 characters and symbols described in the areas separated.

In this stage, if the sheet is an example of formal sheet 400 of FIG. 4, there is obtained a result of recognition of branch number 411, account number 414, a transaction amount 415, and a client name 417. Simultaneously, there are obtained by image processor 5326 separated images of the areas of branch number 411, account number 414, a transaction amount 415, client name 417, and print of a seal 419. In this case, when a result of recognition of account number 414 and client name 417 is obtained, seal collator 5325 acquires via seal retriever 534, in response to an indication from the sheet recognition macro program for pertinent formal sheet 400, image data of registered seal print 420 of a client identified by the recognition result including account number 413 and client name 418 from seal database 537 and conducts pattern matching with seal print 419 separated from formal sheet 400 to determine whether or not these items are equal to each other or to calculate similarity therebetween. The seal collation may be carried out by data entry terminals 6-1 to 6-*n*.

(3) When the image data separation of fields required for the confirmation by the clerk at data entry terminals 6-1 to 6-*n* and recognition of characters thereof are finished, "format check (A)" 1407 is executed. Although this "format check (A)" 1407 is not a primary section of the present invention to determine a sheet type, "format check (A)" 1407 conducts a format check to determine presence or absence of conflict between field data items recognized and presence or absence of items not described. If a defect in the format such as an item not described is detected, a flag of the condition is added to the recognition result.

(4) The separation image data of the specified areas and the data of the recognition result attained as above are edited in a field number sequence to be stored in a transmission area of message queue buffer 52.

In this description, the separation image data to be used for the visual confirmation by the clerk is separated from the monochrome multi-value image data and the image data of areas for the character recognition is separated from the monochrome binary value image data. The reason why the image data to be used for the visual confirmation by the clerk is separated from the monochrome multi-value image data is that gradation of a thin line and a point as well as the contents of description can be clearly discriminated. In this case, it is also possible that the data is not separated from the monochrome multi-value image data, but a color image itself is separated. However, the monochrome multi-value image data has a greater data quantity and is advantageous in consideration of the communication time and cost. Therefore, it is desirable to separate the data from the monochrome multi-value image data.

Sheet recognizer 53 of this embodiment similarly separates, also the promissory note of FIG. 5, the barcode sheet of FIG. 6, the MT sheet of FIG. 7, and the OCR sheet of FIG. 8; image data of specified areas to be used for the visual confirmation by the clerk from the monochrome multi-value image data according to sheet format definition information, image data of character recognition areas from the monochrome binary value image data according to sheet format definition information, and recognizes characters contained in the image data separated. Thereafter, sheet recognizer 53 edits the separation image data and a result of recognition for each sheet and stores these items in message queue buffer 52.

Figure 13:
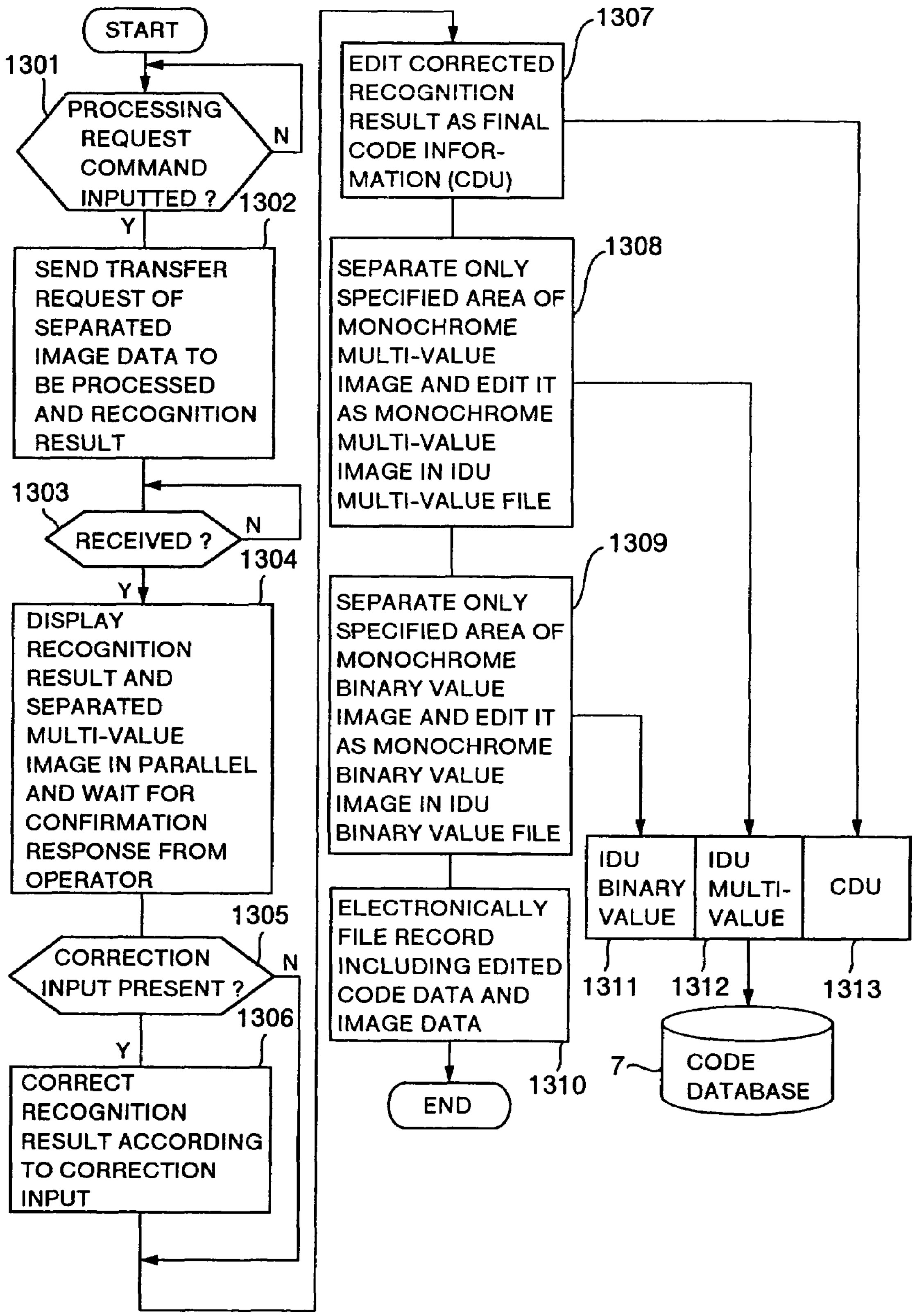
FIG. 13 is a diagram showing a processing procedure in a data entry terminal.

FIG. 13 is a flowchart showing processing in which a result of recognition by recognition server 5 is confirmed by the clerk at data entry terminals 6-1 to 6-*n* and the recognition result confirmed is filed by electronic filer 9.

In FIG. 13, when a processing request command is inputted (step 1301) to data entry terminal 6-*n* in a wait state awaiting a processing request command from a clerk, terminal 6-*n* transmits to recognition server a transfer request for separation image data and a recognition result not processed (step 1302).

In response thereto, recognition server 5 returns, if separation image data and a recognition result not processed remain in message queue buffer 52, the separation image data and data of the recognition result not processed to terminal 6-*n*.

Having received the separation image data and data of the recognition result not processed, data entry terminal 6-*n* displays the received separation image data (monochrome multi-value image data) and data of the recognition result not processed on a display screen in parallel with each other and waits for a confirmation reply from the operator (clerk).

In this situation, if the clerk conducts a correction input operation for the recognition result, the recognition result is corrected according to the correction input (steps 1305 and 1306). However, if the correction input is not conducted and a confirmation reply is received, the recognition result is assumed to be correct and is edited as final code information (code data unit (CDU); step 1307). If the correction input is present, the correction result corrected is edited as final code information (step 1307).

Among the separation images in specified areas displayed according to the monochrome multi-value image data, monochrome multi-value image data of an area specified by the clerk is separated to be edited in an IDU multi-value file. When no area is specified by the clerk, the entire monochrome multi-value image data in the areas displayed is edited in the IDU multi-value file.

Alternatively, monochrome multi-value image data of only important items beforehand specified are edited in the IDU multi-value file.

In this description, the monochrome multi-value image data is an image separated from specified areas set to sheet format definition file 536. The reason why a section of the separation image is further selected by the clerk is that any item which is not necessary after the visual confirmation is deleted to a maximum extent to save the memory capacity in the electronic filing.

Next, monochrome binary value image data of areas specified by the clerk is similarly separated and is edited in an IDU binary file (step 1309).

Finally, code data (CDU) of the recognition result edited 1313, monochrome multi-value image data (IDU multi-value) 1312, and monochrome binary value image data (IDU binary value) 1311 are sent as one record of data to electronic filer 9 to be electronically filed in code database 7 (step 1310).

By the electronic filing above, when a failure occurs in the processing or when an enquiry is received from a client, pertinent data can be immediately retrieved for confirmation.

Although the image reader is illustratively described to read an image of a sheet placed on a sheet plate, the present invention is not restricted by this image reader. There may be naturally used image readers of various reading types such as an image reader in which a sheet is inserted in a similar manner as for a facsimile device.

Figure 15:
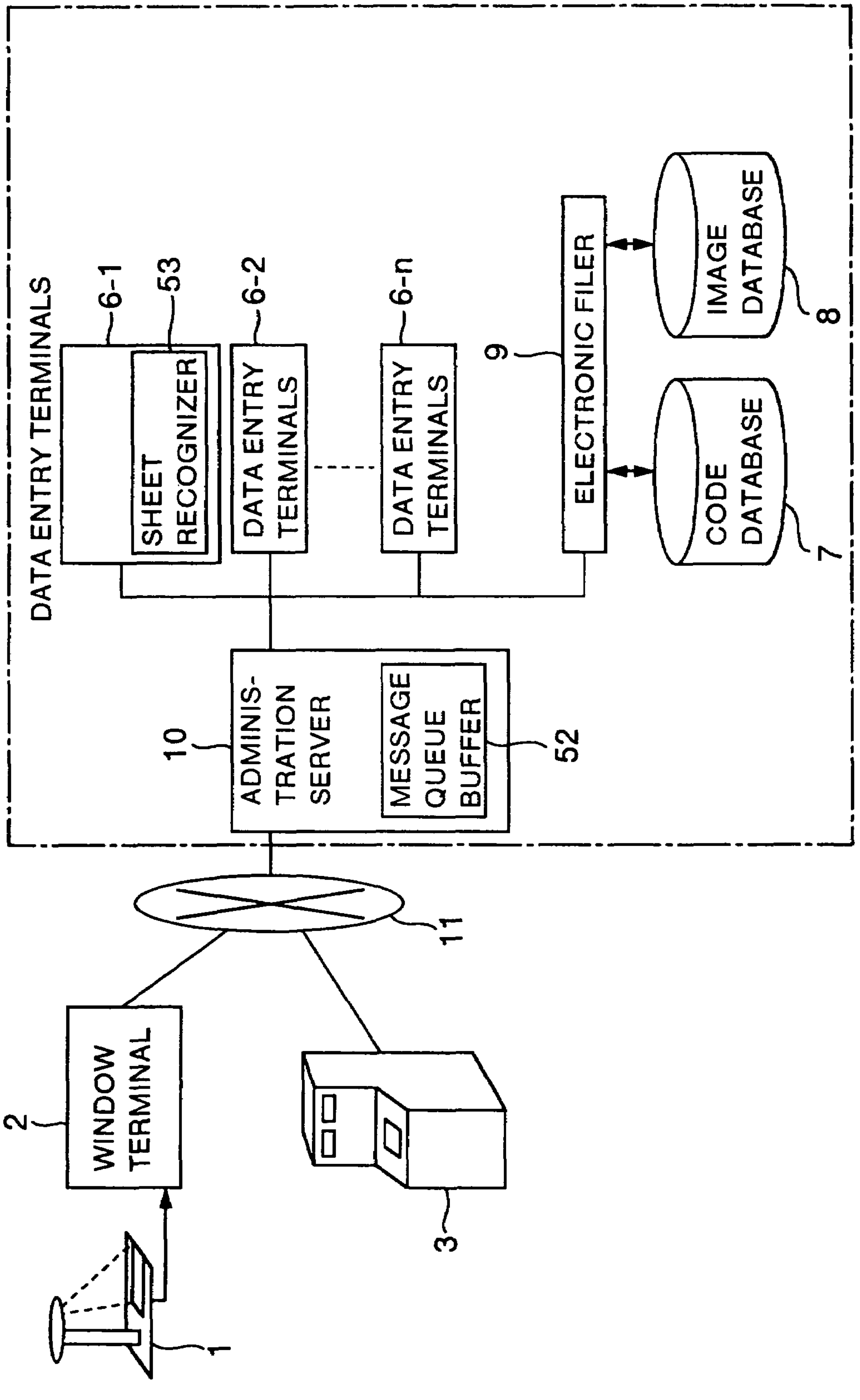
FIG. 15 is a system configuration diagram showing an example in which a sheet recognizer is disposed in a data entry terminal.

Additionally, although the recognition of the contents described on the sheet is conducted in the recognition server, there may be used a configuration in which sheet recognizer 53 is disposed in a data entry terminal. In FIG. 15, the recognition server is removed and message queue buffer 52 is disposed in administration server 10, and the same constituent components as those of FIG. 1 are assigned with the same reference numerals.

As above, in accordance with this embodiment, the contents described on a sheet as a processing object are read as an image and image data read is sent to a recognition server. In the recognition server thus configured, data of a monochrome multi-value image of an area beforehand specified and data of a monochrome binary value image of a character recognition area are separated and character recognition is conducted, and data is sent to a data entry terminal for confirmation by the clerk. When an operation for confirmation or correction is received from the clerk, data is electronically filed. Moreover, data is supplied to an application process corresponding to the sheet contents. Consequently, in a sheet handling job in a financial institution in which it is required to display an image for confirmation by the clerk, the quantity of data transferred to the recognition server is reduced to a necessary minimum quantity and hence the communication cost can be saved.

At the window terminal, there is conducted only operation to read the sheet as a processing object, and hence the sheets to be processed can be sequentially processed regardless of the processing time of character recognition, and hence efficiency of the window job can be increased. Particularly, even when the window terminal is installed in a retail store other than a financial institution, the clerk of the center apparatus finally confirms the contents of the sheet. Therefore, the window job can be conducted by a person who has not received any special training, which can contribute to improvement of efficiency in the application processing of a financial institution.

According to the present invention, various types of sheets can be easily identified in a short period of time as above. Furthermore, in a sheet handling job in a financial institution in which it is required to display an image for confirmation by the clerk, the quantity of data transferred to the center apparatus can be reduced to a necessary minimum quantity, and hence the communication cost can be saved, which can contribute to improvement of efficiency in the application processing of a financial institution.

While the present invention has been described in detail and pictorially in the accompanying drawings, it is not limited to such details since many changes and modifications recognizable to those of ordinary skill in the art may be made to the invention without departing from the spirit and scope thereof.

What is claimed is:

1. A sheet image processing system for processing a plurality of types of sheets, comprising:

an image acquiring unit which acquires an image of a sheet;

an image editing unit which creates a binary image and a multi valued image based on the image obtained by said image acquiring unit;

a sheet identifying unit which identifies a type of the sheet using the binary image created at said image editing unit, a recognizing unit which character recognizes said binary image created at said image editing unit based on an identification result of the type of the sheet identified by said sheet identifying unit; and an area separating unit which, based on a result of sheet type identification at said sheet identifying unit, separates an image of a predetermined area according to a type of the sheet from the binary image and multi-valued image created at said image editing unit, a display unit which, based on the result of the sheet type identification showing a check, displays the multi-valued image of a whole of said check as well as a binary image of a transaction amount of money and a person's name involved, and a multi-valued image of a stamp, that are separated at said area separating unit, and also displays a result of character recognition on the transaction amount of money and person's name made by said recognizing unit.

2. A sheet image processing system according to claim 1, wherein said display unit displays the binary images of a transaction amount of money and person's name and result of character recognition of the transaction amount of money and person's name, said binary image of the transaction amount of money and result of character recognition of the transaction amount of money being displayed in parallel with each other, and said binary image of the person's name and result of character recognition of the person's name being displayed in parallel with each other.

3. A sheet image processing system according to claim 1, whether the multi-valued image of a whole of said check is to be displayed or not is determined based on an identification result of the type of the sheet by said sheet identifying unit.

4. A sheet image processing system according to claim 1, wherein said image acquiring unit is included in an image reading apparatus, said image editing unit is included in a window terminal, and said recognizing unit and said display unit are included in a center apparatus, wherein said window terminal sends the binary image and multi-valued image created by said image editing unit, and said center apparatus stores said binary image and multi-valued image in a pair.

5. A sheet image processing system for processing a plurality of types of sheets, comprising:

an image acquiring unit which acquires an image of a sheet;

an image editing unit which creates a binary image and a multi-valued imaged based on the image obtained by said image acquiring unit;

a sheet identifying unit which identifies a type of the sheet using the binary image created by said image editing unit;

a recognizing unit which character recognizes said binary image created by said image editing unit based on an identification result of the type of the sheet identified by said sheet identifying unit;

an area separating unit which, based on a result of sheet type identification at said sheet identifying unit, separates an image of a predetermined area according to a type of the sheet from the binary image and multi-valued image created at said image editing unit; and a display unit which displays a binary image separated by said area separating unit and a recognition result thereof corresponding to said binary image recognized by said recognition unit, the multi-valued image separated by said area separating unit, and a multi-valued image of the whole sheet including said binary image and multi-valued image.

6. A sheet image processing system according to claim 5, wherein said display unit displays a binary image and a result of recognition of said binary image in parallel with each other.

7. A sheet image processing system according to claim 5, wherein whether the multi-valued image of a whole of said check is to be displayed or not is determined based on an identification result of the type of the sheet by said sheet identifying unit.

8. A sheet image processing system according to claim 5, wherein said image acquiring unit is included in an image reading apparatus, said image editing unit is included in a window terminal, and said recognizing unit and said display unit are included in a center apparatus, wherein said window terminal sends the binary image and multi-valued image created by said image editing unit and said center apparatus stores said binary image and multi-valued image in a pair.

* * * * *